United States Patent [19]
Fraley et al.

[11] Patent Number: 5,722,291
[45] Date of Patent: Mar. 3, 1998

[54] MANUAL TRANSMISSION WITH SYNCHRONIZED REVERSE GEAR

[75] Inventors: Glenn W. Fraley, Canton; Wayne E. Mueller, Milford; George A. Parsons, Grosse Pointe, all of Mich.

[73] Assignee: New Venture Gear, Inc., Troy, Mich.

[21] Appl. No.: 703,313

[22] Filed: Aug. 26, 1996

[51] Int. Cl.[6] ..................... F16H 03/08
[52] U.S. Cl. ................. 74/325; 74/329; 74/331
[58] Field of Search ............... 74/325, 331, 333, 74/359, 342, 329

[56] References Cited

U.S. PATENT DOCUMENTS

| | | |
|---|---|---|
| 4,463,622 | 8/1984 | Freilburger . |
| 4,558,607 | 12/1985 | Szodfridt . |
| 4,640,141 | 2/1987 | Knodel et al. . |
| 4,662,242 | 5/1987 | Atkinson et al. ............... 74/359 X |
| 4,738,149 | 4/1988 | Janiszewski . |
| 4,738,150 | 4/1988 | Miner . |
| 4,776,227 | 10/1988 | Janiszewski . |
| 4,799,395 | 1/1989 | Janiszewski . |
| 4,802,373 | 2/1989 | Saint-Jean et al. . |
| 5,079,965 | 1/1992 | Leber et al. ............... 74/325 X |
| 5,199,316 | 4/1993 | Hoffmann ............... 74/331 X |
| 5,311,789 | 5/1994 | Henzler et al. . |
| 5,353,661 | 10/1994 | Ordo ............... 74/331 |
| 5,385,065 | 1/1995 | Hofmann . |
| 5,479,835 | 1/1996 | Esparsa et al. . |
| 5,495,775 | 3/1996 | Lees et al. . |
| 5,557,978 | 9/1996 | McAskill ............... 74/333 X |
| 5,609,072 | 3/1997 | Lequis et al. ............... 74/331 X |

FOREIGN PATENT DOCUMENTS 2081825  2/1982  United Kingdom .

*Primary Examiner*—Khoi Q. Ta
*Assistant Examiner*—Peter T. Kwon
*Attorney, Agent, or Firm*—Harness, Dickey & Pierce, P.L.C.

[57] ABSTRACT

A manual transmission for use in motor vehicles is disclosed. The transmission includes an input shaft, an output shaft, and a plurality of constant-mesh gearsets that can be selectively engaged for establishing corresponding forward gears therebetween. In addition, a reverse gear assembly is provided for establishing the reverse gear. The reverse gear assembly includes an idler shaft, a first idler gear rotatably supported on the idler shaft and which is driven by the input shaft, a second idler gear fixed to the idler shaft and meshed with a reverse output gear fixed for rotation with the output shaft, and a synchronizer clutch operable for selectively coupling the first idler gear to the idler shaft to establish the reverse gear.

21 Claims, 4 Drawing Sheets

MANUAL TRANSMISSION WITH SYNCHRONIZED REVERSE GEAR

BACKGROUND OF THE INVENTION

The present invention relates generally to multi-speed transmissions for motor vehicles. More specifically, the present invention is directed to a manual transmission having a synchronized reverse gear assembly.

As is well known, shifting gears in manual transmissions is caused by selectively coupling one of the gearsets for driving the output shaft at a predetermined speed ratio relative to the input shaft. While most manual transmissions include a plurality of synchro-mesh gearsets for establishing the forward gears, sliding-type gearsets have traditionally been used for establishing the reverse gear. Modernly, however, manual transmissions are now being equipped with synchronized reverse gear arrangements for preventing the undesirable grinding noise associated with conventional sliding-type arrangements. Exemplary synchronized reverse gear arrangements are disclosed in U.S. Pat. Nos. 4,558,607, 4,640,141 and 5,385,065. While these and other known arrangements appear to satisfactorily perform their desired function, a need still exists to provide alternatives to such conventional synchronized reverse gear arrangements.

SUMMARY OF THE INVENTION

Accordingly, the present invention is directed to a synchronized reverse gear assembly for use in multi-speed manual transmissions. In particular, the synchronized reverse gear assembly of the present invention is applicable for use in transmissions having an input shaft, an output shaft, a first gearset having an input gear fixed to the input shaft and meshed with a first speed gear rotatably supported on the output shaft, and a first synchronizer clutch driven by the output shaft for selectively coupling the first speed gear thereto to provide a forward gear. The reverse gear assembly includes an idler shaft, a first idler gear rotatably supported on the idler shaft and meshed for driven rotation with the input shaft, a second idler gear fixed to the idler shaft and meshed with the first synchronizer clutch, and a second synchronizer clutch for selectively coupling the first idler gear to the idler shaft to provide a reverse gear. As an alternative, the second idler gear can also be rotatably supported on the idler shaft and the second synchronizer clutch can function to selectively couple the first idler gear to the second idler gear to provide the reverse gear.

BRIEF DESCRIPTION OF THE DRAWINGS

Further objects, features and advantages of the present invention will become apparent to those skilled in the transmission art from studying the following description and the accompanying drawings in which.

DETAILED DESCRIPTION OF THE INVENTION

Figure 1:
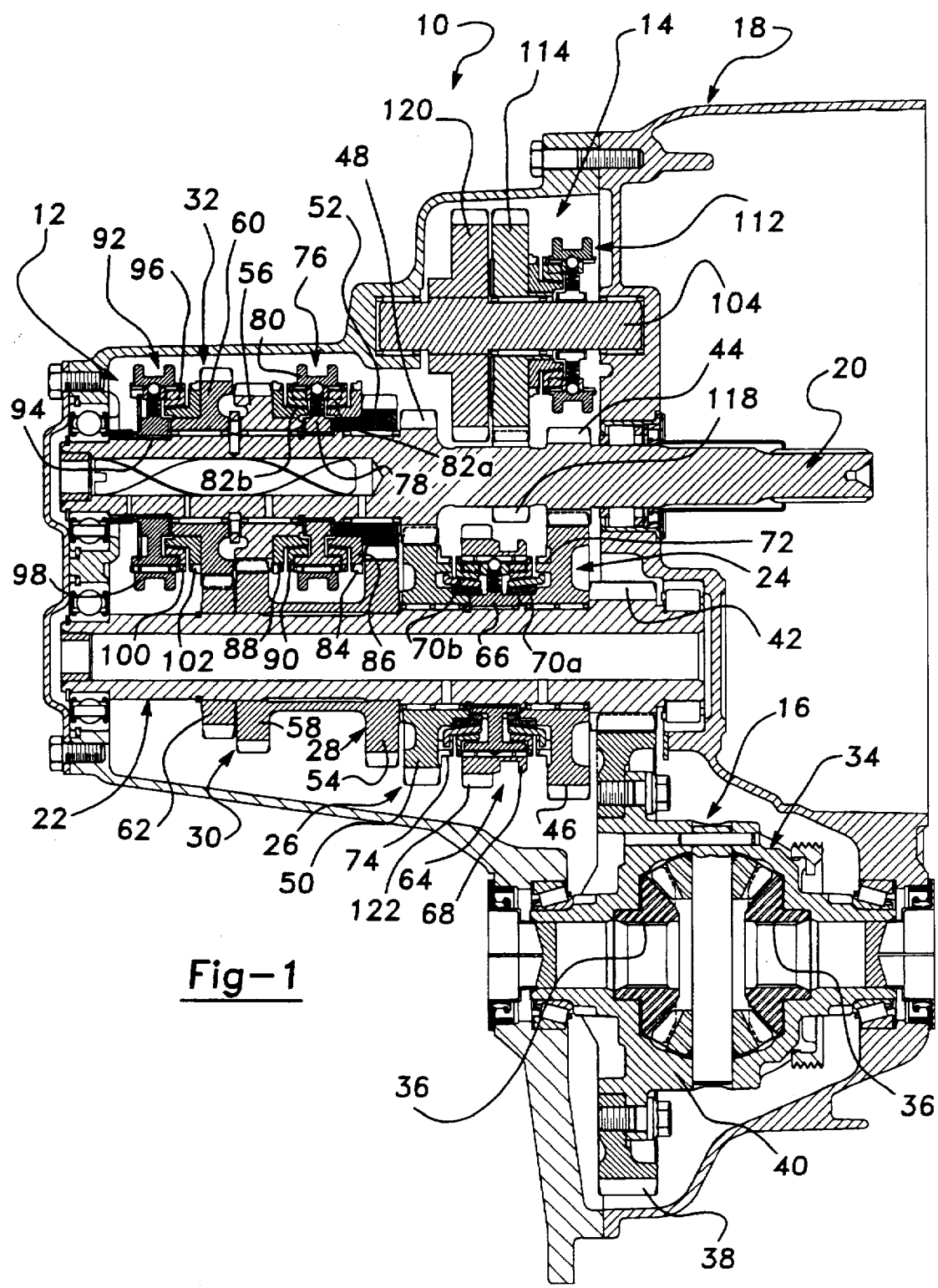
FIG. 1 is a section view of a multi-speed transmission equipped with a reverse gear assembly according to one embodiment of the present invention.

Referring to FIG. 1, a multi-speed transmission 10 of the transaxle variety is shown that is adapted for use in front wheel drive motor vehicles. In general, transmission 10 includes a multi-speed geartrain 12, a reverse gear assembly 14, and a power transfer mechanism 16, all of which are operably mounted within a transmission housing 18. Geartrain 12 includes an input shaft 20 that is adapted to be rotatably driven by the output shaft of the motor vehicle's engine and which is connectable thereto through engagement of a manually-operable clutch (not shown). Geartrain 12 also includes an output shaft 22 and a series of constant-mesh gearsets 24, 26, 28, 30 and 32. Each gearset can be selectively engaged for coupling output shaft 22 to input shaft 20 for establishing five different forward speed ratios (i.e., five forward gears). Likewise, reverse gear assembly 14 can be selectively engaged for coupling output shaft 22 to input shaft 20 for establishing a reverse speed ratio (i.e., reverse gear). Power transfer mechanism 16 is rotatably driven by output shaft 22 and includes a differential assembly 34 that is operable for delivering drive torque through a pair of side gears 36 to a pair of front wheel drive shafts (not shown). A drive gear 38 is shown fixed to housing 40 of differential assembly 34 and is in constant meshed engagement with an output gear 42 formed on output shaft 22. As is known, driven rotation of housing 40 results in side gears 36 being rotatively driven while permitting speed differentiation therebetween. As seen, input shaft 20, output shaft 22, reverse gear assembly 14 and differential assembly 34 are all rotatably supported within housing 18 by suitable bearings.

With continued reference to FIG. 1, first gearset 24 is shown to include a first input gear 44 fixed to input shaft 20 and a first speed gear 46 rotatably supported on output shaft 22. First input gear 44 is in constant mesh with first speed gear 46 for defining a first power transmission path from input shaft 20 to output shaft 22 so as to establish the first speed ratio therebetween. Second gearset 26 includes a second input gear 48 fixed to input shaft 20 and a second speed gear 50 rotatably supported on output shaft 22. Second input gear 48 is in constant mesh with second speed gear 50 for defining a second power transmission path from input shaft 20 to output shaft 22 and establishing the second speed ratio therebetween. Third gearset 28 includes a third input gear 52 rotatably supported on input shaft 20 that is in constant mesh with a third speed gear 54 fixed to output shaft 22 for defining a third power transmission path from input shaft 20 to output shaft 22 and establishing the third speed ratio therebetween. Fourth gearset 30 includes a fourth input gear 56 rotatably supported on input shaft 20 and which is in constant mesh with a fourth speed gear 58 fixed to output shaft 22 thereby establishing a fourth power transmission path at the fourth speed ratio therebetween. Finally, fifth gearset 32 includes a fifth input gear 60 rotatably supported on input shaft 20 and which is in constant mesh with a fifth speed gear 62 fixed to output shaft 22 thereby establishing a fifth power transmission path and the fifth speed ratio therebetween.

As noted, geartrain 12 is arranged to selectively deliver drive torque from input shaft 20 to output shaft 22 through one of the five different power transmission paths for establishing five different forward gears. To this end, each gearset of geartrain 12 is associated with a selectively engageable synchronizing clutch. More particularly, a first synchronizer clutch 64 is operably installed between first gearset 24 and second gearset 26 and includes a first hub 66 fixed to output shaft 22, a first shift sleeve 68, and a pair of cone-type synchronizers 70a and 70b. First synchronizer clutch 64 is of the double-acting variety such that first shift sleeve 68 is supported for common rotation with and bi-directional axial movement on first hub 66 for selectively coupling one of first and second gearsets 24 and 26, respectively, to output shaft 22 for establishing either of the first or second forward gears. In particular, forward axial movement of first shift sleeve 68 from its neutral position shown energizes synchronizer 70a which, in turn, causes speed synchronization between first gearset 24 and output shaft 22. Upon completion of the speed synchronization, first shift sleeve 68 moves into engagement with clutch teeth 72 on first speed gear 46 for engaging the first power transmission path and establishing the first forward gear. In a like manner, rearward axial movement of first shift sleeve 68 energizes synchronizer 70b and causes speed synchronization between second gearset 26 and output shaft 22. Thereafter, first shift sleeve 68 moves into engagement with clutch teeth 74 on second speed gear 50 for engaging the second power transmission path and establishing the second forward gear.

A second synchronizer clutch 76 is operably installed between third and fourth gearsets 28 and 30 and includes a second hub 78 fixed to input shaft 20, a second shift sleeve 80, and a pair of cone-type synchronizers 82a and 82b. Second synchronizer clutch 76 is also a double-acting arrangement with second shift sleeve 80 supported on second hub 78 for common rotation therewith and bi-directional axial movement thereon for selectively coupling one of third and fourth gearsets 28 and 30, respectively, to input shaft 20 for establishing either of the third or fourth forward gears. Specifically, forward axial movement of second shift sleeve 80 from its neutral position shown causes speed synchronization between third gearset 28 and input shaft 20 and results in engagement of second shift sleeve 80 with clutch teeth 84 on a clutch ring 86 that is fixed to third input gear 52, thereby engaging the third power transmission path and establishing third forward gear. Rearward axial movement of second shift sleeve 80 causes speed synchronization between fourth gearset 30 and input shaft 20 and results in engagement of second shift sleeve 80 with clutch teeth 88 on a clutch ring 90 fixed to fourth input gear 56, thereby engaging the fourth power transmission path and establishing the fourth forward gear.

A third synchronizer clutch 92, of the single-acting type, is operably installed adjacent to fifth gearset 32 and includes a third hub 94 fixed to input shaft 20, a synchronizer 96, and a third shift sleeve 98 that is supported for rotation with and axial movement on third hub 94 for selectively coupling fifth gearset 32 to input shaft 20 to establish the fifth forward gear. In particular, forward axial movement of third shift sleeve 98 from the neutral position shown causes speed synchronization between fifth gearset 32 and input shaft 20 and results in engagement of third shift sleeve 98 with clutch teeth 100 on a clutch ring 102 fixed to fifth input gear 60, thereby engaging the fifth power transmission path and establishing the fifth forward gear. As seen in FIG. 1, each of shift sleeves 68, 80 and 98 is shown positioned in a central or non-engaged position for establishing a neutral mode in which drive torque is not transferred from input shaft 20 to output shaft to 22 through any of the gearsets. As will be appreciated, the synchronizers can be of any conventional construction currently known in the manual transmission art, with such alternative arrangements considered equivalent thereto.

Figure 2:
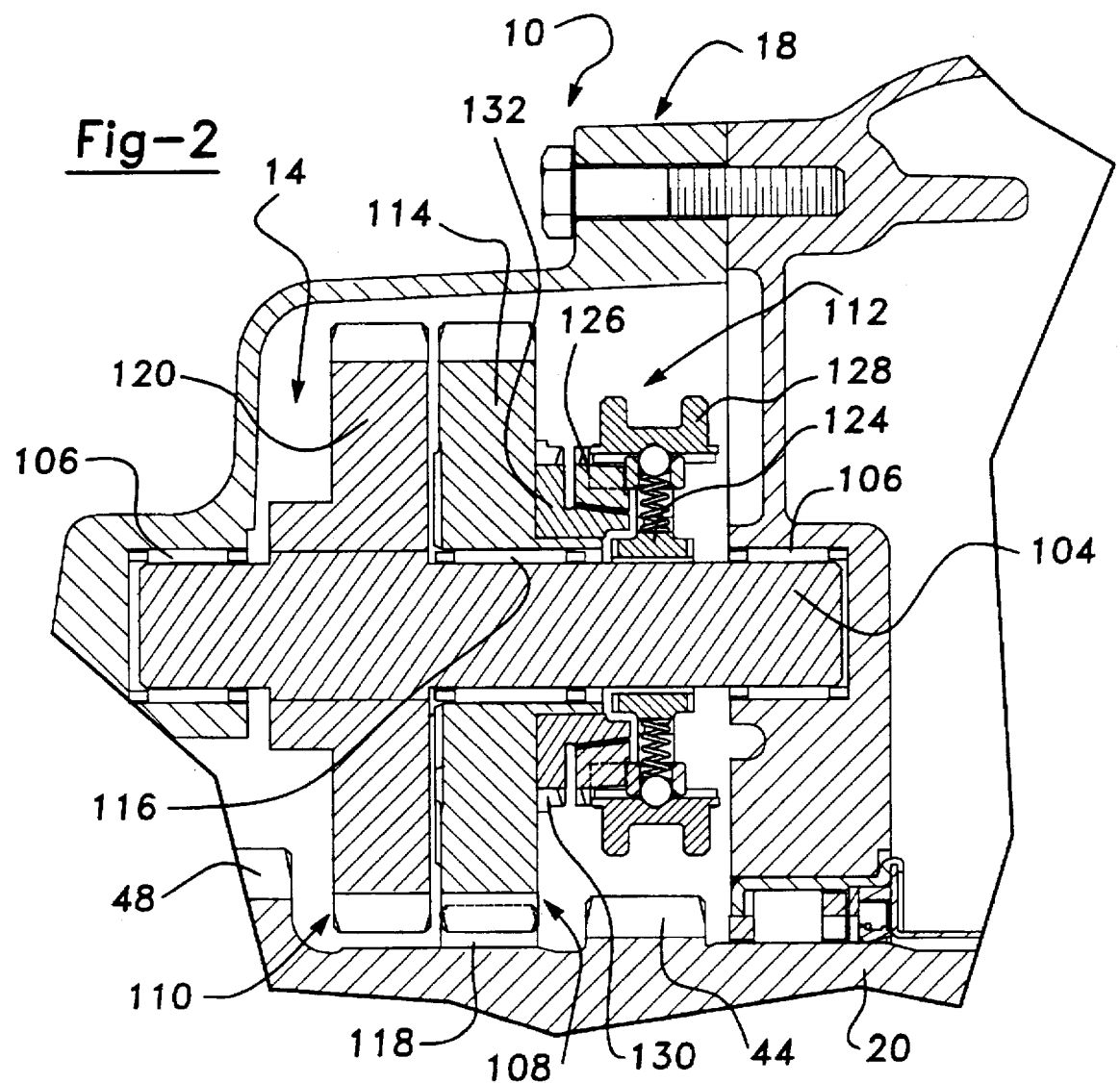
FIG. 2 is an enlarged partial view of FIG. 1 showing the components of the reverse gear assembly in greater detail.

To provide means for establishing the reverse gear, reverse gear assembly 14 is shown in FIGS 1 and 2 to include an idler shaft 104 rotatably supported from housing 18 by bearings 106, a sixth constant-mesh gearset 108, a seventh constant-mesh gearset 110, and a fourth synchronizer clutch 112. Sixth gearset 108 includes a first idler gear 114 rotatably supported by bearings 116 on idler shaft 104 and which is meshed with a reverse input gear 118 fixed to input shaft 20. Thus, driven rotation of input shaft 20 causes direct rotation of first idler gear 114. Seventh gearset 110 includes a second idler gear 120 fixed to idler shaft 104 and which is meshed (as schematically shown by phantom lines) with a reverse output gear 122 fixed to first shift sleeve 68. Moreover, reverse output gear 122 is adapted to maintain continuous meshed engagement with second idler gear 120 during bi-directional axial movement of first shift sleeve 68. Fourth synchronizer clutch 112 is operable for selectively coupling sixth gearset 108 to idler shaft 104 when it is desired to establish the reverse gear. As best seen from FIG. 2, fourth synchronizer clutch 112 includes a fourth hub 124 fixed to idler shaft 104, a cone-type synchronizer 126, and a fourth shift sleeve 128 that is supported on fourth hub 124 for rotation therewith and axial movement thereon between the neutral disengaged position shown and an engaged position. In the engaged position, fourth shift sleeve 128 is coupled to clutch teeth 130 on a clutch ring 132 that is fixed to first idler gear 114. Thus, when fourth shift sleeve 128 is in its engaged position, input shaft 20 drives idler shaft 104 which, in turn, drives seventh gearset 110. Accordingly, first shift sleeve 68 transmits the reverse direction of rotation from input shaft 20 through first hub 66 to output shaft 22. First shift sleeve 68 is positioned in its neutral position, as are second shift sleeve 80 and third shift sleeve 98, when fourth shift sleeve 128 is moved to its engaged position.

Figure 3:
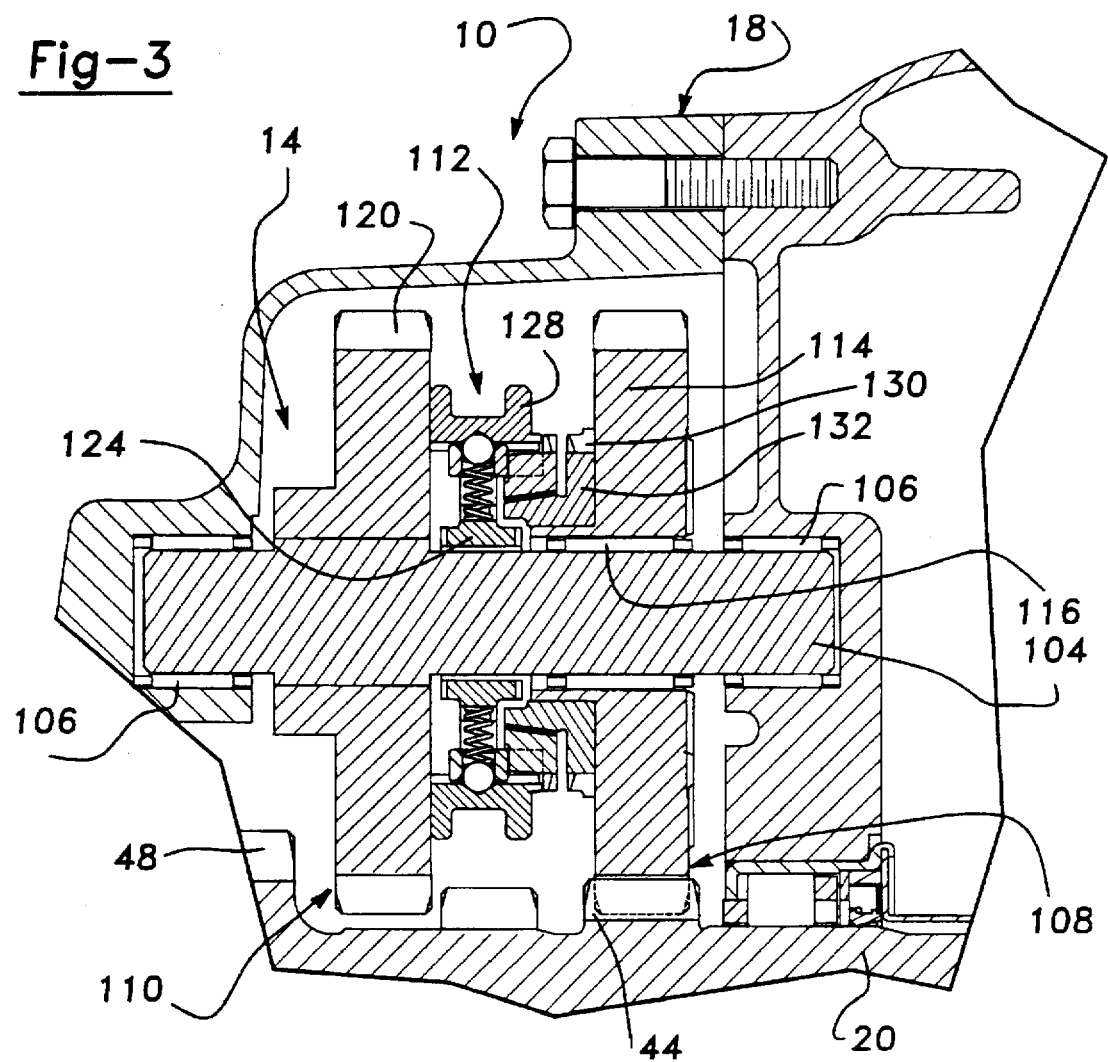
FIG. 3 is a partial sectional view showing an alternative embodiment for the reverse gear assembly.

Referring now to FIG. 3, an alternative arrangement for reverse gear assembly 14 is disclosed. Due to the substantial similarity between the components, like reference numbers are used to identify those components shown in FIG. 3 that are identical or similar in structure and/or function to those described with reference to FIG. 2. In this particular arrangement, reverse input gear 118 has been eliminated, first idler gear 114 is shown to be in constant mesh with first input gear 44, second idler gear 120 is still meshed with reverse output gear 122, and fourth synchronizer clutch 112 is shown operably disposed between first and second idler gears 114 and 120, respectively. In a further alternative arrangement, idler shaft 104 could be arranged such that first idler gear directly meshes with first speed gear 46 instead of first input gear 44.

Figure 4:
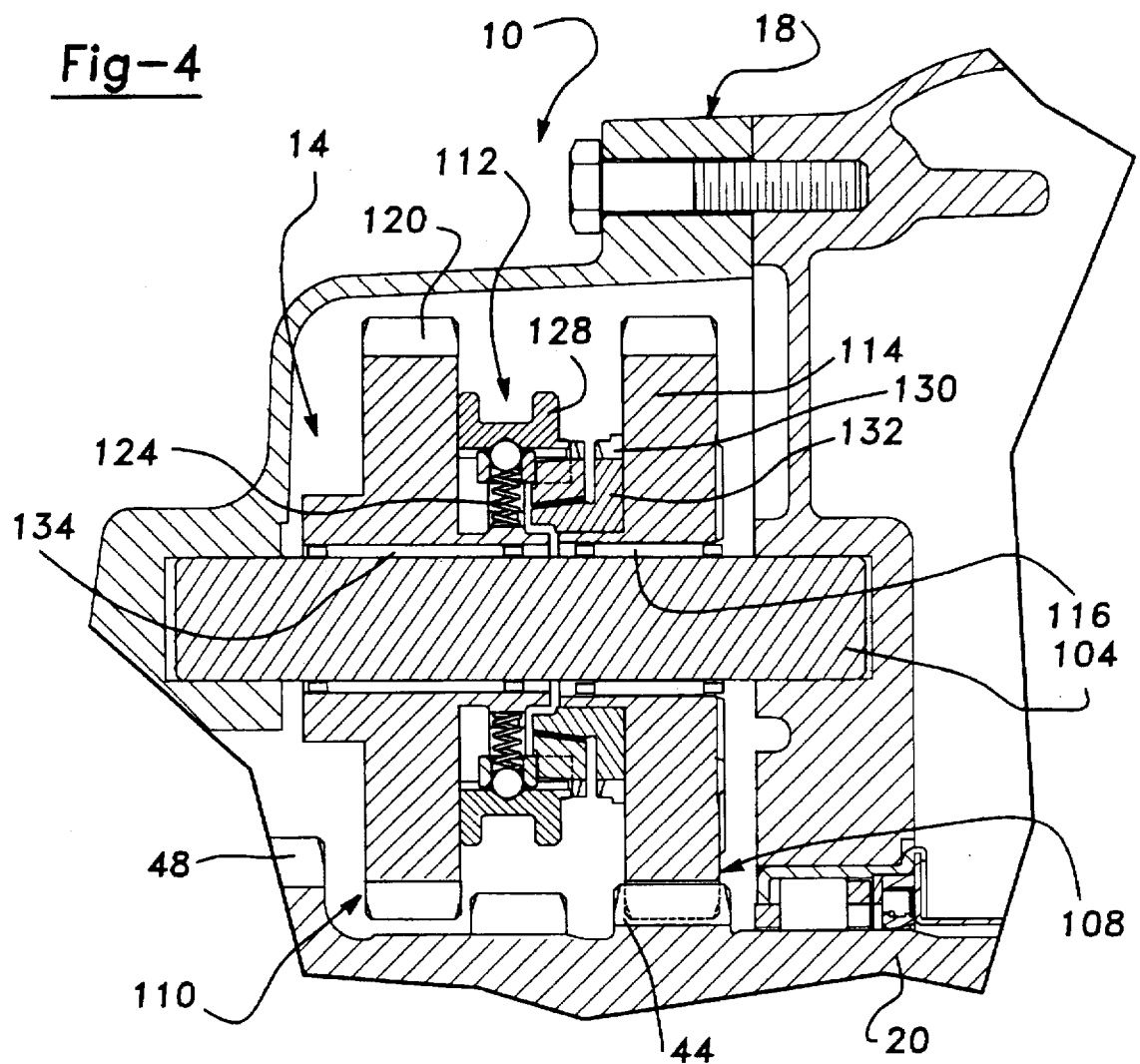
FIG. 4 is a partial sectional view showing yet another alternative embodiment for the reverse gear assembly.

Referring to FIG. 4, a further modified version of reverse gear assembly 14 is shown. In particular, idler shaft 104 is shown to be non-rotationally fixed to housing 18, first idler gear 114 is still rotatably supported by bearings 116 on idler shaft 104 and meshed with first input gear 44, second idler gear 120 is rotatably supported by bearings 134 on idler shaft 104 and still meshed with reverse output gear 122, and fourth synchronizer clutch 112 is shown to have hub 124 fixed to second idler gear 120. Thus, when fourth shift sleeve 128 is in its engaged position, it couples first idler gear 114 to second idler gear 120 instead of idler shaft 104.

Figure 5:
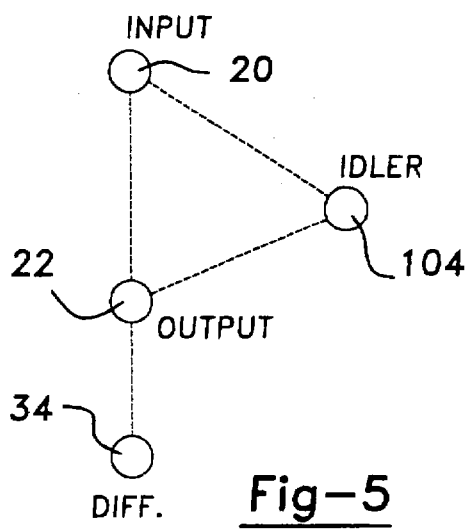
FIG. 5 is a diagram showing the shaft arrangement within the transmission.
Figure 6:
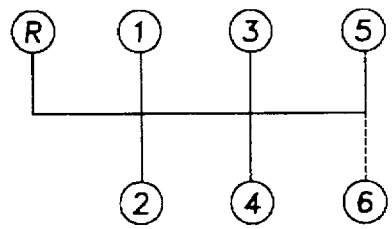
FIG. 6 is a shift gate diagram showing the forward and reverse positions for the gearshift lever.

In FIG. 5, the parallel positioning of input shaft 20, output shaft 22 and idler shaft 104 are shown as preferably arranged in a triangular orientation within housing 18. With this arrangement, the constant-mesh engagement of the gear components associated with sixth gearset 108 and seventh gearset 110 can be established. FIG. 6 shows the gate or shift pattern for the gearshift lever used to establish the five forward gears and the reverse gear. A suitable shift mechanism interconnects each of the four shift sleeves to the gearshift lever such that the vehicle operator can select the desired gear. The shift mechanism can be any known mechanical, hydraulic or electrically-actuated system that is capable of coordinating movement of shift sleeves 68, 80, 98 and 128. Finally, the five-speed gearbox disclosed could easily be modified to include a sixth forward gear by the simple addition of an eighth gearset and a synchronizer that are positioned on the opposite side of third synchronizer clutch 92 with third shift sleeve 98 being movable to selectively couple the eighth gearset to input shaft 20.

The foregoing discussion discloses and describes various preferred embodiments of the present invention. It is contemplated that the reverse gear assemblies disclosed herein could easily be adapted for use with other multi-speed geartrains arranged for either front-wheel drive or rear-wheel drive vehicular applications. As such, those skilled in the art will readily recognize from such discussion, and from the accompanying drawings and claims, that various changes, modifications and variations can be made therein without departing from the true spirit and fair scope of the invention as defined in the following claims.

What is claimed is:

1. A transmission comprising:
   a housing;
   an input shaft rotatably supported in said housing;
   an output shaft rotatably supported in said housing;
   a gearset having a first input gear fixed to said input shaft and meshed with a first speed gear rotatably supported on said output shaft;
   a first synchronizer clutch driven by said output shaft for selectively coupling said first speed gear thereto to provide a forward gear;
   an idler shaft rotatably supported in said housing;
   a first idler gear rotatably supported on said idler shaft and in driving connection with said input shaft;
   a second idler gear fixed to said idler shaft and in driving connection with said first synchronizer clutch; and
   a second synchronizer clutch for selectively coupling said first idler gear to said idler shaft to provide a reverse gear.

2. The transmission of claim 1 wherein said first idler gear is in driving connection with said input shaft by meshing with a reverse input gear fixed to said input shaft.

3. The transmission of claim 1 wherein said first idler gear is in driving connection with said input shaft by meshing with said first input gear.

4. The transmission of claim 1 wherein said first idler gear is in driving connection with said input shaft by meshing with said first speed gear.

5. The transmission of claim 1 further comprising a second gearset having a second input gear fixed to said input shaft and meshed with a second speed gear rotatably supported on said output shaft, and wherein said first synchronizer clutch is operable for selectively coupling said second speed gear to said output shaft for establishing a second forward gear.

6. The transmission of claim 1 wherein said first synchronizer clutch includes a hub fixed to said output shaft, a shift sleeve supported on said hub for rotation therewith and sliding movement thereon, and a synchronizer interposed between said shift sleeve and said first speed gear, said shift sleeve being movable between a neutral position uncoupled from said first speed gear and an engaged position coupled to said first speed gear, and wherein said second idler gear is in driving connection with said first synchronizer clutch by meshing with a reverse output gear fixed to said shift sleeve.

7. The transmission of claim 1 wherein said second synchronizer clutch includes a shift sleeve fixed for rotation with said idler shaft and movement thereon between a disengaged position uncoupled from said first idler gear and an engaged position coupled to said first idler gear.

8. The transmission of claim 1 wherein said first synchronizer clutch includes a shift sleeve in driving connection with said output shaft, and wherein said second idler gear is meshed with a reverse output gear fixed to said shift sleeve.

9. A transmission comprising:
   a first shaft;
   a second shaft;
   a first gearset having a first input gear fixed to said first shaft that is meshed with a first speed gear rotatably supported on said second shaft;
   a first shift sleeve fixed for rotation with said second shaft and movable from a neutral position to an engaged position for coupling said first speed gear to said second shaft to establish a forward gear;
   a third shaft;
   a second gearset having a reverse input gear fixed to said first shaft that is meshed with a first reverse idler gear rotatably supported on said third shaft;
   a third gearset having a second reverse idler gear fixed to said third shaft that is meshed with a reverse output gear fixed to said first shift sleeve; and
   a second shift sleeve fixed for rotation with said third shaft and movable from a disengaged position to an engaged position for coupling said first reverse idler gear to said third shaft to provide a reverse gear.

10. The transmission of claim 9 further comprising synchronizer means for causing speed synchronization between said first shaft and said second shaft in response to movement of said first shift sleeve to said engaged position.

11. The transmission of claim 9 further comprising synchronizer means for causing speed synchronization between said third shaft and said first shaft in response to movement of said second shift sleeve to said engaged position.

12. A transmission comprising:
   a first shaft;
   a second shaft;
   a first gear fixed to said first shaft;
   a second gear rotatably mounted on said second shaft and meshed with said first gear;
   a first shift sleeve fixed for rotation with said second shaft and movable for selectively coupling said second gear to said second shaft to provide a forward gear;
   a third shaft;
   a third gear rotatably supported on said third shaft and rotatably driven by said first shaft;
   a fourth gear fixed to said third shaft and meshed with a fifth gear fixed to said first shift sleeve; and
   a second shift sleeve fixed for rotation with said third shaft and movable for selectively coupling said third gear to said third shaft for establishing a reverse gear.

13. The transmission of claim 12 wherein said third gear is meshed with a sixth gear that is fixed to said first shaft.

14. The transmission of claim 12 wherein said third gear is meshed with said first gear.

15. The transmission of claim 12 wherein said third gear is meshed with said second gear.

16. The transmission of claim 12 further comprising first synchronizer means for causing speed synchronization between said second gear and said second shaft in response to movement of said first shift sleeve toward said second gear, and a second synchronizer means for causing speed synchronization between said first shaft and said third shaft in response to movement of said second shift sleeve toward said third gear.

17. A transmission comprising:

a housing;

an input shaft rotatably supported in said housing;

an output shaft rotatably supported in said housing;

a gearset having a first input gear fixed to said input shaft and meshed with a first speed gear rotatably supported on said output shaft;

a first synchronizer clutch driven by said output shaft for selectively coupling said first speed gear thereto to provide a forward gear;

an idler shaft rotatably supported in said housing;

a first idler gear rotatably supported on said idler shaft and in driving connection with said input shaft;

a second idler gear rotatably supported on said idler shaft and in driving connection with said first synchronizer clutch; and a second synchronizer clutch for selectively coupling said first idler gear to said second idler gear to provide a reverse gear.

18. The transmission of claim 17 wherein said second synchronizer clutch includes a shift sleeve fixed for rotation with said second idler gear and movement thereon between a disengaged position uncoupled from said first idler gear and an engaged position coupled to said first idler gear.

19. The transmission of claim 17 wherein said first synchronizer clutch includes a shift sleeve in driving connection with said output shaft, and wherein said second idler gear is meshed with a reverse output gear fixed to said shift sleeve.

20. A transmission comprising:

a first shaft;

a second shaft;

a first gear fixed to said first shaft;

a second gear rotatably mounted on said second shaft and meshed with said first gear;

a first shift sleeve fixed for rotation with said second shaft and movable for selectively coupling said second gear to said second shaft to provide a forward gear;

a third shaft;

a third gear rotatably supported on said third shaft and rotatably driven by said first shaft;

a fourth gear rotatably supported on said third shaft and meshed with a fifth gear fixed to said first shift sleeve; and a second shift sleeve fixed for rotation with said fourth gear and movable for selectively coupling said third gear to said fourth gear for establishing a reverse gear.

21. The transmission of claim 20 further comprising first synchronizer means for causing speed synchronization between said second gear and said second shaft in response to movement of said first shift sleeve toward said second gear, and a second synchronizer means for causing speed synchronization between said first shaft and said third shaft in response to movement of said second shift sleeve toward said third gear.

* * * * *